United States Patent Office 2,810,455
Patented Oct. 22, 1957

2,810,455
METHOD OF DEHYDRATING GASES

Preston L. Veltman, Severna Park, Md., assignor to W. R. Grace & Co., New York, N. Y., a corporation of Connecticut No Drawing. Application October 17, 1955, Serial No. 541,076

9 Claims. (Cl. 183—114.2)

This invention relates to a method of dehydrating gases and to a novel composition which is suitable for use in gas dehydration processes.

It is frequently necessary to remove practically all of the water vapor from certain gases before they can be successfully used in subsequent operations. For instance, if water occurring in most fuel gas is not removed, an unduly high rate of corrosion will occur in the transmission lines and trouble may also be encountered from the freezing of valves in cold weather. In the transportation of natural gas via pipe lines, water vapor is removed before transmission of the gas to prevent certain of the light hydrocarbons from forming hydrates which, at low temperatures, take the form of ice or slush. This material causes constriction of the pipes and interferes with the operation of valves, regulators and other equipment.

The drying of gas is generally conducted at relatively high pressures. In the drying operation, solid desiccants are used in cyclic systems wherein a bed of solid desiccant is alternately used and regenerated by heating with hot gases when the breakpoint of the bed is reached. In conventional operations, drying is carried out serially wherein a drying tower is alternated about every eight hours. The conventional type of regenerative system has many disadvantages in that massive, high pressure equipment must be alternately heated and cooled to operating temperatures. This subjects the desiccant to stresses which tend to decrepitate the solid mass with the attendant formation of fine material. The fines cause valve and line plugging, and in addition, become entrained in the gas. Another disadvantage is that the production of fines in the system tend to reduce the life of the bed.

The present invention provides a novel dehydrating composition and a method of using the same in gas drying operations whereby it is possible to conduct drying in a single unit on a continuous basis. For reactivation, it is unnecessary to remove the composition from the system, thus eliminating the need of using a plurality of units and the attendant difficulties encountered in the operational equipment are also obviated. The desiccant composition can be handled as a liquid and be regenerated by heating and purging to drive off water vapor.

The dehydrating composition comprises a finely divided solid desiccant material suspended in a non-aqueous liquid medium which is capable of circulating the desiccant around the drying system. The liquid medium must be one which is chemically inert, thermally stable, possess good heat transfer and minimum moisture barrier characteristics, and one that will not boil at regenerating temperatures. Compounds such as diphenyl and certain other lubricating oil stocks serve as satisfactory liquids. Desiccants such as silica gel, activated alumina, etc., are suitable for this purpose, the criterion being that the selected desiccant be one which is capable of remaining suspended in the liquid medium.

In preparing the novel dehydrating composition, silica gel is preferred as the desiccant because of its high adsorptive capacity and selectivity for water. The usual procedure for manufacturing the gel is to react an alkali metal silicate with an acid to form a hydrosol, which upon standing forms the hydrogel. The hydrogel is then washed to remove soluble impurities, following which it is dried and then activated to a total volatile content of between 4.5–7.5% by heating at a temperature of about 400° F. In the present invention, a gel so prepared is ground to a desired fineness (through 200 mesh) and mixed with a non-aqueous liquid medium to form a free-flowing suspension of gel particles in the liquid medium. It has been found that a 30–40% by weight gel suspension flows rather freely. Alternatively, the dehydrating composition may be prepared by mixing dried ground gel with the liquid medium and heating the mixture to activate the gel.

In employing the composition in gas dehydration processes, a gas is passed into a drying tower in contact with a stream of the dehydrating composition, adsorption of water taking place during movement of the materials therein. The gas and agent may be introduced into the tower concurrently through separate lines or countercurrently and the unit operated at full line pressure. In the concurrent system, the velocity of the gas as it is passed upwardly into the tower may supply the force to jet the dehydrating agent around a cyclic system. Since the gas is lighter than the moisture-laden composition, separation of the two presents no problem. The gas is simply passed out of the system and the composition is channeled to a regeneration zone and recycled for reuse. In the countercurrent system, the wet gas is passed upwardly into the tower and is contacted therein by a downwardly flowing dehydrating composition. The dried gas is then passed out of the drying system while the dehydrating agent is directed to a regenerating zone.

Regeneration of the dehydrating composition is effected by passing it from the drying tower to a heated zone where the water is volatilized and then driven out of the regenerator by passing a purging gas therein. The reactivated composition is then passed to a cooler and recycled in the system. Thus, continuity of operation is achieved through the use of a single drying unit which represents an improvement over the prior processes wherein successive units are cut out for reactivation while other units remain in the operation during the reactivation period.

In the present invention, a packed tower is preferred over an unpacked column. The packing tends to break up the stream of dehydrating composition, thus providing a thorough distribution of the composition in the tower which permits greater contact between the desiccant and wet gas. Materials suitable as packing are Raschig rings, spiral rings, saddles, etc. In several experiments, the lower dewpoint attainable with an unpacked column was approximately 50° F., whereas with a packed column, the lowest attainable dewpoint was approximately 12° F.

This invention is further illustrated by the following example.

EXAMPLE 1

A washed silica gel dried and activated to a total volatile content of 6.50%, ground to a fineness of T–200 mesh and mixed with a suitable amount of mineral oil to form the dehydrating composition which comprised a 40% suspension of gel by weight. Properties of the oil were as follows:

| | |
|---|---|
| Gravity, degrees API | 26.5 |
| Pour point, ° F | −30 |
| Flash, COC, ° F | 415 |
| Fire, ° F | 455 |
| Viscosity, SSU @ 100° F | 311.9 |
| Viscosity, SSU, @ 210° F | 49.8 |
| Viscosity index | 64 |

250 grams of the gel-oil suspension were placed in a 1¼ inch diameter column filled with Raschig rings (made from 5 mm. glass tubing) and the inlet to the column was fitted with a fritted glass disc. 100% RH air at 70–80° F. was passed into the column in contact with the dehydrating composition under the conditions and with the results as shown in the following table:

Table I

| Flow Rate of Air, ft.³/hr. | Influent Dew Point | Effluent Dew Point | Percent Water Removed |
|---|---|---|---|
| 0.061 | 72 | 13 | 96 |
| 0.17 | 74 | 16 | 90 |
| 0.21 | 72 | 18 | 93 |
| 0.26 | 70 | 12 | 90 |
| 0.32 | 79 | 33 | 82 |
| 0.47 | 76 | 46 | 66 |
| 0.86 | 76 | 50 | 55 |
| 1.33 | 70 | 50 | 51 |
| 1.57 | 76 | 55 | 52 |
| 2.12 | 75 | 56 | 49 |

The dehydrating composition was activated in situ and 9 grams of water were removed.

EXAMPLE 2

A 30% suspension of gel by weight in a refrigerator grade paraffin oil was activated and placed in a 2-inch diameter column packed with Raschig rings made from 5 mm. glass tubing. Drying data are shown below:

Table II

| Flow Rate of Air, ft.³/hr. | Influent Dew Point | Effluent Dew Point | Percent Water Removed |
|---|---|---|---|
| 0.22 | 76 | 22 | 85 |
| 0.26 | 75 | 23 | 84 |
| 0.28 | 76 | 27 | 84 |
| 0.40 | 80 | 28 | 87 |
| 0.50 | 76 | 41 | 72 |
| 0.60 | 75 | 34 | 75 |
| 0.84 | 75 | 44 | 67 |
| 3.99 | 79 | 65 | 42 |

From the above examples, it can be seen that the novel dehydrating composition will reduce the moisture content of a gas by approximately 50% and upwards, depending on the flow rate.

The extent of drying is related to the contact between the moisture-laden gas and the dehydrating composition. With a few simple experiments, one can easily determine the optimum flow rates of gas and dehydrating composition to obtain maximum drying. The diffusion of water vapor through the non-aqueous liquid medium of the desiccant composition to the gel is also significant but this rate of diffusion is constant at a given temperature. The liquid medium retains the desiccating material in an orderly suspended stream thus preventing valve and line clogging as experienced in using solid desiccants alone.

The dehydrating composition should find particular application in drying such gases as $CO_2$, $O_2$, $H_2$ and in drying operations as practiced in the petroleum industry.

I claim:

1. A method for dehydrating a gas which comprises contacting wet gas with a dehydrating composition consisting of a finely divided solid desiccant suspended in an inert, non-aqueous, water-immiscible, thermally-stable liquid medium which is capable of circulating the desiccant around a drying system, and separating dried gas therefrom.

2. A method according to claim 1 in which the desiccant is silica gel.

3. A method according to claim 2 in which the liquid medium is a mineral oil.

4. A method for dehydrating a gas in a cyclic system which comprises passing wet gas into a confined space, introducing a dehydrating composition into said space in contact with said gas thereby adsorbing moisture therefrom said dehydrating composition consisting of a finely divided solid desiccant suspended in an inert, non-aqueous, water-immiscible, thermally-stable liquid medium which is capable of circulating the desiccant around the system, withdrawing dried gas, passing the moisture-laden dehydrating composition to a regenerating zone, heating said desiccant in said zone to liberate the adsorbed moisture, purging the moisture from said system, and cooling and recycling the dehydrating composition.

5. A method according to claim 4 in which the wet gas is passed upwardly into the confined space and contact therein is made with a downwardly moving stream of said dehydrating composition.

6. A method according to claim 4 wherein the desiccant is silica gel.

7. A method for dehydrating a gas which comprises contacting wet gas in a drying zone with a dehydrating composition consisting of 30–40% by weight of silica gel having a particle size substantially through 200 mesh suspended in a mineral oil, and separating dried gas therefrom.

8. A method for dehydrating moisture-laden air which comprises contacting said air in a drying zone with a dehydrating composition consisting of about 30% by weight of finely divided silica gel suspended in about 70% paraffin oil, and withdrawing dried air therefrom.

9. A method for dehydrating moisture-laden air which comprises contacting said air in a drying zone with a dehydrating composition consisting of about 40% by weight of silica gel having a particle size substantially through 200 mesh suspended in a mineral oil.

References Cited in the file of this patent

UNITED STATES PATENTS

| 214,412 | Lugo | Apr. 15, 1879 |
| 1,234,600 | Allen | July 24, 1917 |
| 1,539,342 | Williams | May 26, 1925 |
| 2,260,625 | Kistler | Oct. 28, 1941 |
| 2,424,467 | Johnson | July 22, 1947 |
| 2,636,575 | Watson | Apr. 28, 1953 |
| 2,760,598 | Dietz et al. | Aug. 28, 1956 |